(12) United States Patent
Jensen et al.

(10) Patent No.: US 12,181,916 B2
(45) Date of Patent: Dec. 31, 2024

(54) DEVICE PUSH-TO-OPEN DETECTION AND POWER CONTROL

(71) Applicant: Microsoft Technology Licensing, LLC, Redmond, WA (US)

(72) Inventors: Michael Dale Jensen, Duvall, WA (US); James Hao-An Chen Lin, Issaquah, WA (US); Mika Martti Ylitalo, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 18/046,411

(22) Filed: Oct. 13, 2022

(65) Prior Publication Data

US 2024/0126322 A1    Apr. 18, 2024

(51) Int. Cl.
*G06F 1/16* (2006.01)

(52) U.S. Cl.
CPC .......... *G06F 1/1616* (2013.01); *G06F 1/1677* (2013.01); *G06F 1/1679* (2013.01)

(58) Field of Classification Search
CPC .... G06F 1/1616; G06F 1/1618; G06F 1/1677; G06F 1/1679
See application file for complete search history.

(56) References Cited

U.S. PATENT DOCUMENTS

| | | | |
|---|---|---|---|
| 5,706,332 A | 1/1998 | Nagai | |
| 5,932,855 A | 8/1999 | Wang et al. | |
| 6,006,243 A | 12/1999 | Karidis | |
| 6,366,440 B1 * | 4/2002 | Kung | E05C 19/16 361/679.55 |
| 7,583,500 B2 | 9/2009 | Ligtenberg et al. | |
| 9,395,762 B2 | 7/2016 | Sharma et al. | |
| 9,483,081 B2 | 11/2016 | Lee et al. | |
| 9,552,037 B2 | 1/2017 | Ooi | |
| 9,930,152 B2 | 3/2018 | Kim et al. | |
| 10,114,418 B2 * | 10/2018 | Shin | G06F 1/1647 |
| 10,261,573 B2 * | 4/2019 | Sunwoo | G06F 1/3296 |
| 10,481,641 B2 | 11/2019 | Lee et al. | |
| 10,672,548 B2 * | 6/2020 | Srinivasan | E05C 19/16 |

(Continued)

FOREIGN PATENT DOCUMENTS

| | | |
|---|---|---|
| CN | 201837920 U | 5/2011 |
| CN | 105302249 A | 2/2016 |

(Continued)

OTHER PUBLICATIONS

Mishra, Umakant, "10 Inventions on Laptop Keyboards—A Study Based on US Patents", In Repository of arXiv:1310.3849v1, Oct. 11, 2013, 12 Pages.

(Continued)

*Primary Examiner* — Brian T Misiura
(74) *Attorney, Agent, or Firm* — Alleman Hall & Tuttle LLP

(57) ABSTRACT

A foldable computing device comprises a first frame rotatably coupled to a second frame. The second frame comprises a push-to-open mechanism comprising an actuator and a power switch located for actuation by the actuator. A detection mechanism detects a displaced position of the actuator that corresponds to releasing the foldable computing device from a closed configuration. Actuation of the power switch is detected and used with detection of the displaced position of the actuator to control an operating state of the computing device.

18 Claims, 12 Drawing Sheets

(56) References Cited

U.S. PATENT DOCUMENTS

| | | | |
|---|---|---|---|
| 10,795,416 B2 | 10/2020 | Schmelze et al. | |
| 11,175,720 B2 * | 11/2021 | Lai | G06F 1/3246 |
| 11,243,563 B2 * | 2/2022 | Singla | H04M 1/0214 |
| 11,616,867 B2 * | 3/2023 | Kwon | H04M 1/0243 |
| | | | 455/575.3 |
| 11,811,961 B2 * | 11/2023 | Zhang | H04N 23/60 |
| 2002/0069483 A1 | 6/2002 | Savolainen et al. | |
| 2003/0011972 A1 * | 1/2003 | Koo | G06F 1/1677 |
| | | | 361/726 |
| 2008/0304215 A1 | 12/2008 | Chiu | |
| 2015/0227377 A1 * | 8/2015 | Park | G06F 9/4418 |
| | | | 713/2 |
| 2017/0168631 A1 | 6/2017 | Roberts-hoffman | |
| 2019/0164675 A1 | 5/2019 | Srinivasan et al. | |
| 2019/0220064 A1 * | 7/2019 | Park | G06F 1/3206 |
| 2019/0394894 A1 | 12/2019 | Kim | |
| 2020/0273613 A1 | 8/2020 | Lauder et al. | |
| 2021/0318721 A1 | 10/2021 | Li | |
| 2021/0365079 A1 | 11/2021 | Weldon et al. | |
| 2022/0264756 A1 | 8/2022 | Oh | |
| 2023/0421672 A1 * | 12/2023 | Wendt | H01F 7/04 |

FOREIGN PATENT DOCUMENTS

| | | | |
|---|---|---|---|
| EP | 2463744 | A1 | 6/2012 |
| JP | 2004213981 | A | 7/2004 |
| JP | 2008199215 | A | 8/2008 |
| WO | 2020011376 | A1 | 1/2020 |
| WO | 2021015781 | A1 | 1/2021 |
| WO | 2022164081 | A1 | 8/2022 |

OTHER PUBLICATIONS

"Application as Filed in Netherlands Patent Application No. N2031418", Filed Date: Mar. 28, 2022, 26 Pages.

"Search Report Issued in Netherlands Patent Application No. N2031418", Mailed Date: Nov. 16, 2022, 11 Pages.

"International Search Report and Written Opinion Issued in PCT Application No. PCT/US23/062711", Mailed Date: Apr. 3, 2023, 15 Pages.

International Search Report and Written Opinion received for PCT Application No. PCT/US24/015887, Jun. 5, 2024, 14 pages.

* cited by examiner

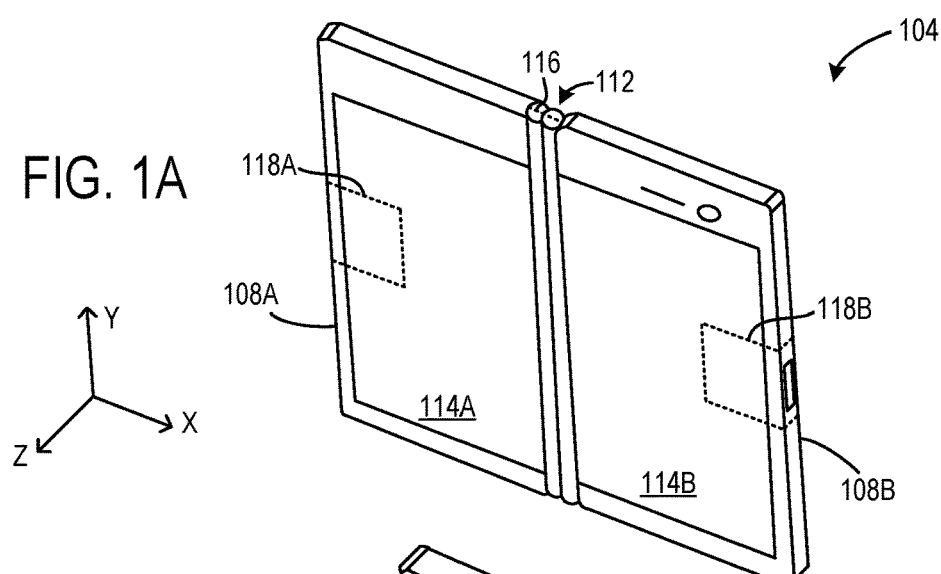
FIG. 1A
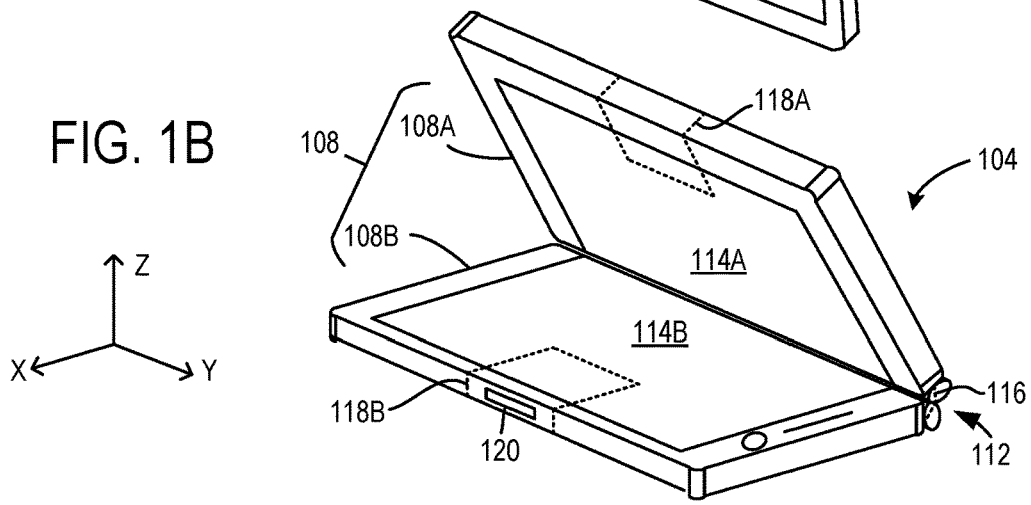
FIG. 1B
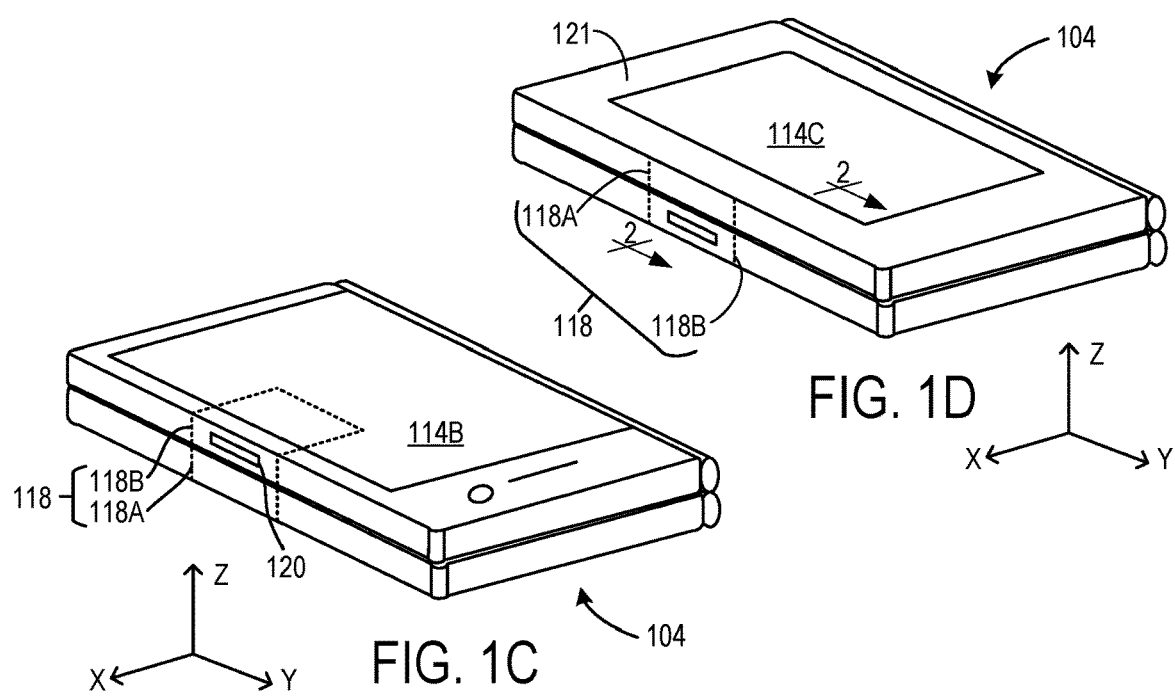
FIG. 1C
FIG. 1D

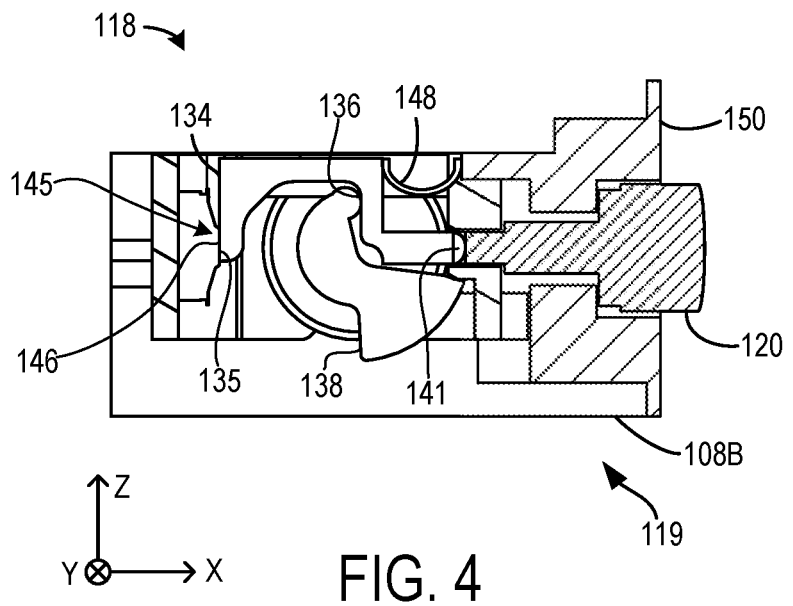
FIG. 4
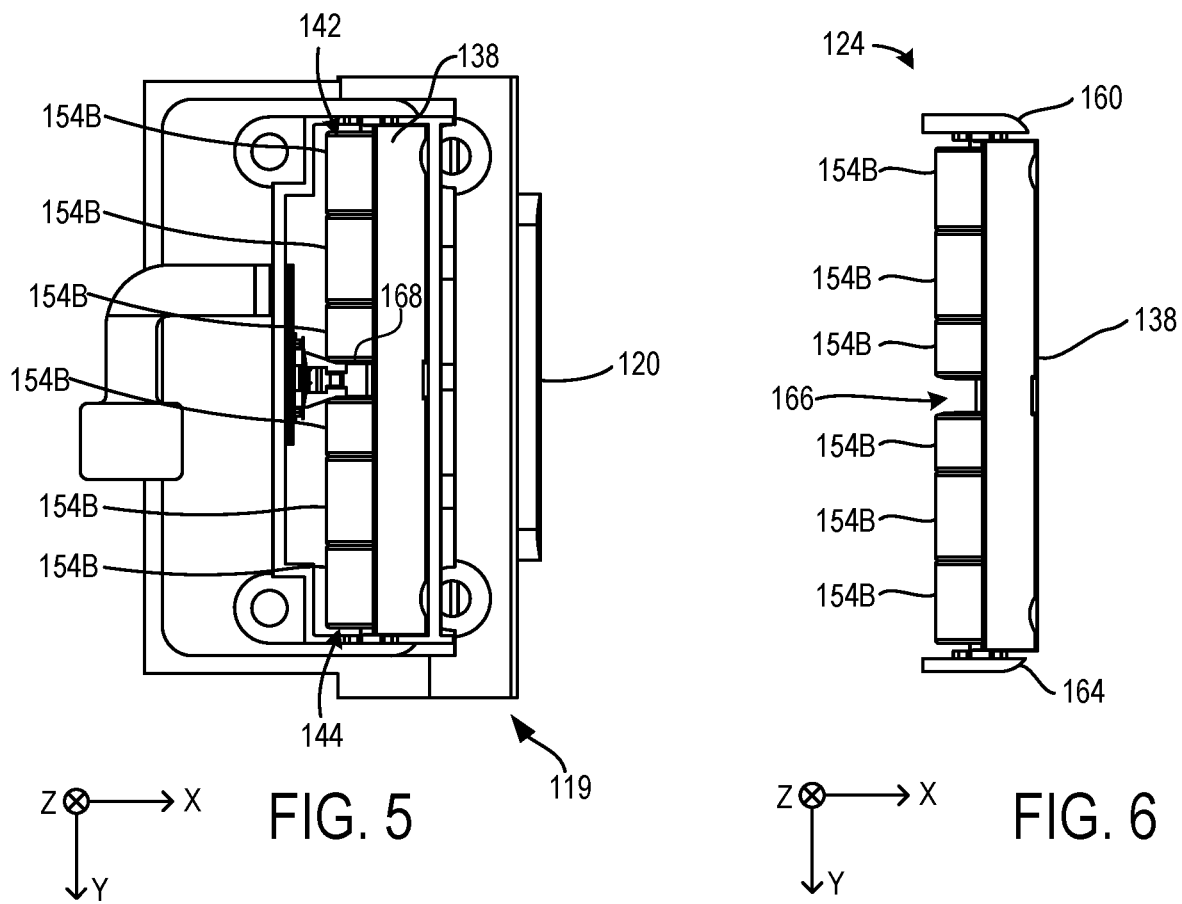
FIG. 5
FIG. 6

DEVICE PUSH-TO-OPEN DETECTION AND POWER CONTROL

BACKGROUND

In some devices such as foldable computing devices, two chassis are rotatably coupled to be movable with respect to one another.

SUMMARY

According to one aspect of the present disclosure, a foldable computing device comprises a first frame and a second frame rotatably coupled to the first frame. The second frame comprises a push-to-open mechanism comprising an actuator and a power switch located for actuation by the actuator. A detection mechanism is configured to detect at least a displaced position of the actuator that corresponds to releasing the foldable computing device from a closed configuration.

The device includes a memory storing instructions executable by a processor to detect an actuation of the power switch by the actuator and, using at least the detection of the actuation of the power switch and a detection of the displaced position of the actuator, control an operating state of the computing device. In some examples and as described further below, controlling an operating state of the computing device includes suppressing an output signal from the power switch to advantageously prevent the occurrence of a corresponding power switch event, such as preventing the device from powering down one or more display screens.

Another aspect provides a method for controlling an operating state of a foldable computing device. The foldable computing device comprises a first frame rotatably coupled to a second frame. The second frame comprises a push-to-open mechanism comprising an actuator and a power switch located for actuation by the actuator. A detection mechanism is configured to detect at least a displaced position of the actuator that corresponds to releasing the foldable computing device from a closed configuration. The method comprises detecting an actuation of the power switch by the actuator, and using at least the detection of the actuation of the power switch and a detection of the displaced position of the actuator to control the operating state of the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A-1D show one example of a foldable computing device according to examples of the present disclosure.

FIG. 4 is another cross-sectional view taken along line 2-2 of FIG. 1D showing the actuator of the push-to-open mechanism in a displaced position.

FIG. 5 shows a bottom-up view of the second magnet assembly and actuator with the push-to-open mechanism in the displaced position of FIG. 4.

FIG. 6 shows a bottom-up view of the second magnet assembly of FIG. 5.

DETAILED DESCRIPTION

Figure 2:
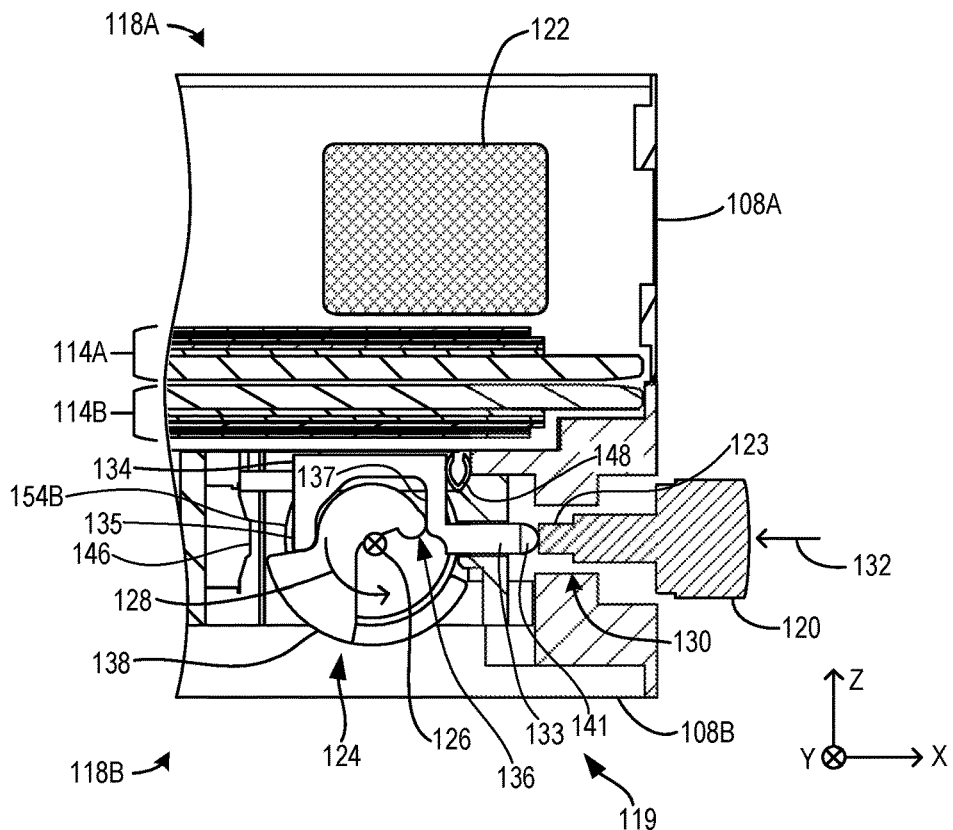
FIG. 2 is a partial cross-sectional view taken along line 2-2 of FIG. 1D showing a portion of a push-to-open mechanism according to examples of the present disclosure.

As introduced above, some devices include a first frame that is rotatably coupled to a second frame. For example, in a dual-screen smartphone or laptop, a first frame and a second frame may each house a touch screen display and may be rotatably coupled such that the two displays are movable with respect to one another. A closing apparatus may secure the first frame and the second frame together in a closed orientation. The device can include a push-to-open mechanism that releases the frames from the closed orientation upon actuation by a user.

In some devices the push-to-open mechanism is coupled with a power switch such that operation of the push-to-open mechanism can also actuate the power switch. In some cases, however, actuating the power switch when the push-to-open mechanism is actuated causes undesirable device behaviors. In one example, where a foldable device includes dual internal screens and an external screen, a user may be reading an email message on the external screen with the device closed. The user may desire to reply to the message using the larger internal dual screens and may actuate the push-to-open mechanism and power switch to open the device. However, actuating the power switch causes all screens to be powered down, thereby interrupting the user's intended action of continuing to interface with the email message on the internal screens.

Accordingly, examples are disclosed that relate to a foldable computing device that includes logic for determining an intended action of a user when the user operates a push-to-open mechanism and associated power switch. As described in more detail below, in different configurations and embodiments the present disclosure provides foldable computing devices that include a push-to-open mechanism comprising an actuator and a power switch located for actuation by the actuator. A detection mechanism is configured to detect at least a displaced position of the actuator that corresponds to releasing the foldable computing device from a closed configuration.

Additionally, the devices include logic for detecting an actuation of the power switch by the actuator and using at least the detection of the actuation of the power switch and a detection of the displaced position of the actuator to control an operating state of the computing device. In some examples, the detection of a power switch actuation and detection of the displaced position of the actuator is utilized to suppress an output signal from the power switch, thereby preventing occurrence of a corresponding power switch event that controls the operating state of the computing device, such as preventing the device from powering down one or more display screens.

With reference now to FIGS. 1A-1D, one example of a foldable computing device 104 in the form of a dual screen mobile computing device is provided. In other examples, the foldable computing device may take the form of a laptop computing device, tablet computing device, or any other form factor of foldable computing device. In the example of FIGS. 1A-1D, the foldable computing device 104 includes a housing 108 having a first frame 108A and a second frame 108B rotatably coupled to the first frame via a hinge 112. The first frame 108A includes a first display 114A and the second frame 108B includes a second display 114B. In this example, the foldable computing device 104 also includes a third, external display 114C located on an exterior surface 121 of the first frame 108A In the example of FIGS. 1A-1D, the first frame 108A and the second frame 108B are movable relative to each other. More particularly, the hinge 112 is configured to permit the first frame 108A and the second frame 108B to rotate 360 degrees between angular orientations from a face-to-face orientation (FIG. 1D) to a back-to-back orientation (FIG. 1C). In other examples, the first frame 108A and the second frame 108B are rotatable relative to one another over a range less than 360 degrees.

With reference now to FIG. 1B, the hinge 112 permits the first frame 108A and the second frame 108B to rotate relative to one another such that an angle between the frames 108A, 108B can be decreased or increased by the user applying suitable force to the housing 108 of the foldable computing device 104. From the angular orientation shown in FIG. 1B, the first frame 108A and the second frame 108B may be rotated until the displays 114A, 114B reach a back-to-back angular orientation as shown in FIG. 1C or a face-to-face orientation (also referred to as a closed configuration) as shown in FIG. 1D.

In some examples, the foldable computing device 104 further comprises a spring 116 that is operatively configured to bias the first frame 108A and the second frame 108B away from the closed configuration of FIG. 1C towards an open configuration. In the example of FIGS. 1A-1D, the spring 116 is located at the hinge 112. In this example, the spring 116 comprises a torsion spring that is operatively configured to apply a torque to the first frame 108A and the second frame 108B about the hinge 112 when the device 104 is in the face-to-face orientation of FIG. 1D, with the torque biasing the first frame 108A and the second frame 108B towards the angular orientation shown in FIG. 1B. In this manner, the spring is operatively configured to open the foldable computing device.

The foldable computing device 104 further comprises an opening/closing apparatus 118 operatively configured to secure the first frame 108A and the second frame 108B in the closed configuration shown in FIG. 1D, and to release the frames from the closed configuration when a push-to-open mechanism 119 is actuated. In this example, a user can view the third, external display 114C when the computing device 104 is in the closed configuration.

Additionally, in one potential advantage of the present disclosure and as described further below, the push-to-open mechanism 119 is operatively configured to allow users to easily open the foldable computing device from the closed configuration of FIG. 1D and to actuate a power switch via a single actuator 120. Additionally and as described in more detail below, the foldable computing device 104 includes a detection mechanism configured to detect at least a displaced position of the actuator that corresponds to releasing the foldable computing device from the closed configuration.

Further, and in another potential advantage of the present disclosure, corresponding logic in the foldable computing device 104 is executed to detect the actuation of the power switch and the displaced position of the actuator, and to utilize such detections to predict one or more intentions of a user operating the actuator, such as the intent to open the device, transition device postures, and/or utilize different displays. Using at least the detection of the power switch actuation and the displaced position of the actuator, the logic predicts a user intention and correspondingly controls an operating state of the computing device to match the predicted intention. Additional aspects of the actuator 120 and logic are described in more detail below.

FIG. 2 shows a partial cross-sectional view of one example of the opening/closing apparatus 118 of FIGS. 1A-1D and push-to-open mechanism 119 taken along line 2-2 of FIG. 1D. As shown in FIG. 2, the first portion 118A of the opening/closing apparatus 118, located at the first frame 108A of the foldable computing device 104, comprises a first magnet assembly 122. The second portion 118B of the opening/closing apparatus 118, located at the second frame 108B, comprises a second magnet assembly 124. The second magnet assembly 124 is operatively configured to attract the first magnet assembly 122 of the first frame 108A when the first frame 108A and the second frame 108B are in the closed configuration of FIG. 1D. In this manner, the first magnet assembly 122 and the second magnet assembly 124 are operatively configured to secure the first frame 108A and the second frame 108B together when the foldable computing device 104 is in the closed configuration.

Figure 3:
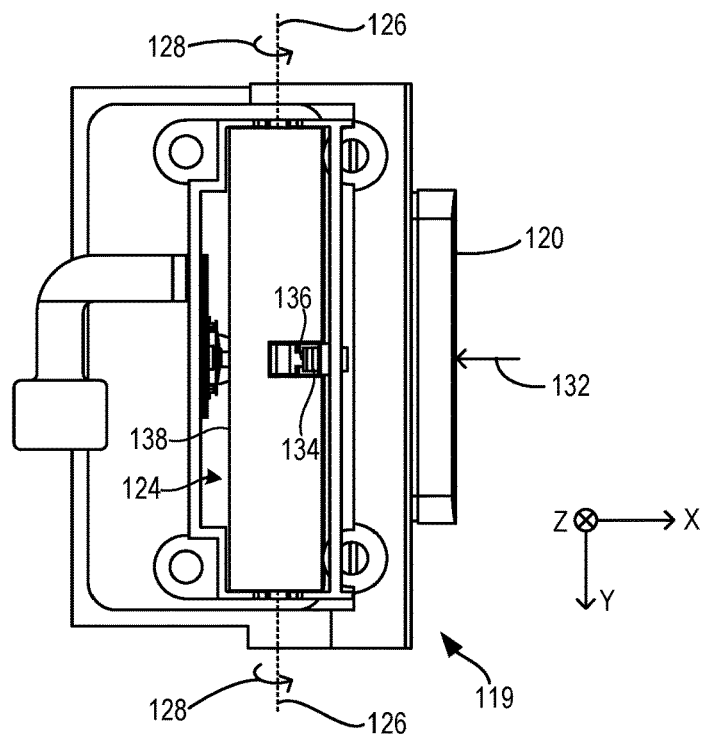
FIG. 3 shows a bottom-up view of a second magnet assembly and actuator of the push-to-open mechanism shown in FIG. 2.

With continued reference to FIG. 2 in this configuration the second magnet assembly 124 is operatively configured for rotation with respect to the second frame 108B. For example, as depicted in FIGS. 2 and 3, the second magnet assembly 124 comprises a cylindrical magnet housing 138 rotatably coupled to the second frame 108B. In different examples the magnet housing 138 contains at least one magnet 154B. In some examples, the magnet housing 138 comprises a plurality of magnets 154B. In the present example, and as described in more detail below with respect to FIG. 6, the magnet housing 138 contains six magnets 154B arranged along the length of the cylindrical magnet housing 138. In other examples, any suitable number of magnets 154B may be utilized. In some examples, the magnet housing 138 contains a single magnet 154B.

In the example of FIG. 2, the second magnet assembly 124 is rotatable around an axis of rotation 126 parallel to the Y-axis. FIG. 3 shows a bottom-up view of the second magnet assembly 124 of FIG. 2 including the axis of rotation 126. Translation of the actuator 120 in the negative x-axis direction causes rotation of the second magnet assembly 124 in a counter-clockwise direction as indicated at 128. This rotation of the second magnet assembly 124 causes corresponding rotation of its magnetic flux distribution in a manner that reduces the magnetic attraction between the first magnet assembly 122 and the second magnet assembly 124. Advantageously, when the actuator 120 reaches a fully displaced position (as shown in FIG. 4) that corresponds to releasing the foldable computing device 104 from the closed configuration, this allows the first frame 108A and the second frame 108B to rotate away from the closed configuration and the foldable computing device to open, for example by allowing the spring 116 to overcome the magnetic attraction between the first magnet assembly and the second magnet assembly, and rotate the first frame and second frame away from one another.

In the example of FIG. 2, the actuator 120 of push-to-open mechanism 119 is mounted within a channel 130 that permits translation of the actuator 120 parallel to the X-axis. As described in more detail below, actuator 120 interfaces with a power switch 141 located between a distal end 123 of the actuator 120 and a proximal end 133 of a pusher arm 134 of the actuator. Additionally, the pusher arm 134 comprises a contacting surface 135 configured to contact a receiving surface 146 when the actuator reaches a fully displaced position (see FIG. 4). Advantageously, in this example the receiving surface 146 forms a portion of a detection mechanism 145 that detects contact with the contacting surface 135, such as via closing of a circuit when the contacting surface contacts the receiving surface.

In this manner, and as described in more detail below, logic of the foldable computing device can utilize actuation of the power switch 141 along with detection of the displaced position of the actuator 120 to predict a user intention and correspondingly control an operating state of the foldable computing device 104. In other examples, a variety of other detection mechanisms, including but not limited to Hall effect sensors, resistive elements, and other types of sensors, are utilized to detect that the actuator reaches a fully displaced position.

FIGS. 2-3 depict the actuator 120 in an extended position, in which the actuator 120 protrudes from the second frame 108B in the positive X-axis direction. The portion of the actuator 120 that protrudes from the second frame 108B in the X-axis direction in this extended position enables users to press the actuator in the negative X-axis direction, as indicated at 132, to reduce the force of attraction between the magnets (disengage the magnets) and open the device. Additionally and as noted above, in this example power switch 141 is located for actuation by the actuator 120 via linear alignment with the direction of movement of the actuator. Accordingly, upon initially translating the actuator 120 in the negative x-axis direction, a user also actuates the power switch 141 to trigger an output signal from the power switch. The power switch 141 is configured to control one or more operating states of the foldable computing device 104. In different examples, the operating state comprises powering on/off one or more of the displays of the foldable computing device 104, transitioning a power state of the device, turning on/off a flashlight or other function of the device, or other functionality of the device.

Accordingly, and in one potential advantage of the present disclosure, the same user operation (e.g., translation 132 of the actuator 120 to its fully displaced position) is operatively configured to actuate the power switch 141 followed by opening the foldable computing device 104. Further and as described in more detail below, in this example logic of the foldable computing device 104 uses the output signal from the power switch 141 to detect actuation of the power switch. Additionally and in some examples described further below, the logic uses at least the detection of the power switch actuation and a detection of the displaced position of the actuator to control an operating state of the computing device.

With reference now to FIGS. 4-5, the actuator 120 is depicted in a depressed position in which the actuator 120 has been translated in the negative X-axis direction into the second frame 108B to its fully displaced position. This translation of the actuator 120 causes the counter-clockwise rotation 128 of the second magnet assembly 124 and magnet housing 138 (see FIG. 2) to the position shown in FIGS. 4 and 5. FIG. 6 shows a bottom-up view of the second magnet assembly 124 and cylindrical magnet housing 138 rotated to the position of FIG. 5. In this example the magnet housing 138 is rotatably coupled to mounting portions 160, 164 of the second frame 108B of the foldable computing device 104.

With reference to FIGS. 2 and 4, in this configuration translation of the actuator 120 in the negative X-axis direction pushes the pusher arm 134 of the actuator toward the magnet housing 138. The pusher arm 134 is operatively configured to apply a force at a contact portion 136 of the housing 138 of the second magnet assembly 124. More particularly and with reference again to FIG. 2, the pusher arm 134 comprises a cutout portion 137 that functions as a camming surface that contacts the contact portion 136 of the housing 138 as the pusher arm is translated. As depicted in FIG. 2, the application of force on the contact portion 136 in the negative X-axis direction causes counterclockwise rotation 128 of the second magnet assembly 124 about the axis of rotation 126 to a rotated orientation depicted in FIG. 4.

In this example, the push-to-open mechanism 119 includes one or more biasing elements that bias the actuator 120 and its pusher arm 134 to remain in the displaced position of FIG. 4 when the first frame 108A and the second frame 108B are in an open configuration, and to remain in this displaced position until the first frame 108A and second frame 108B are returned to the closed configuration. In the example of FIGS. 2-4, a spring 148 (e.g., a leaf spring) biases the pusher arm 134 in the negative X-axis direction to maintain the pusher arm 134 in the fully displaced position after the actuator 120 is depressed.

In this manner, the spring force maintains contact between the contacting surface 135 of the pusher arm 134 and the receiving surface 146 to continue generating an interrupt signal at the detection mechanism indicating that the foldable computing device 104 is in an open configuration. Additionally, when the first frame 108A and the second frame 108B are subsequently folded to the closed orientation of FIG. 2, the magnetic attraction between the first magnet assembly 122 and the second magnet assembly 124 overcomes the biasing force of spring 148 and causes the magnet housing 138 of the second magnet assembly to rotate in the clockwise direction and correspondingly translate the actuator 120 in the positive X-axis direction to increase its protrusion from the second frame 108B.

As noted above, and in one potential advantage of the present disclosure, the push-to-open mechanism 119 and corresponding logic in the foldable computing device 104 are operatively configured to detect an actuation of the power switch 141 by the actuator, and to use at least the detection of the power switch actuation and a detection of the displaced position of the actuator to predict one or more intentions of a user operating the actuator, and correspondingly control an operating state of the computing device to match the predicted intention. Advantageously, this combination of hardware and logic functionality thereby enables and provides lower latency transitions, such as transitions between different displays and/or postures of the foldable device, and avoids unintended changes in an operating state of the device.

Figure 7:
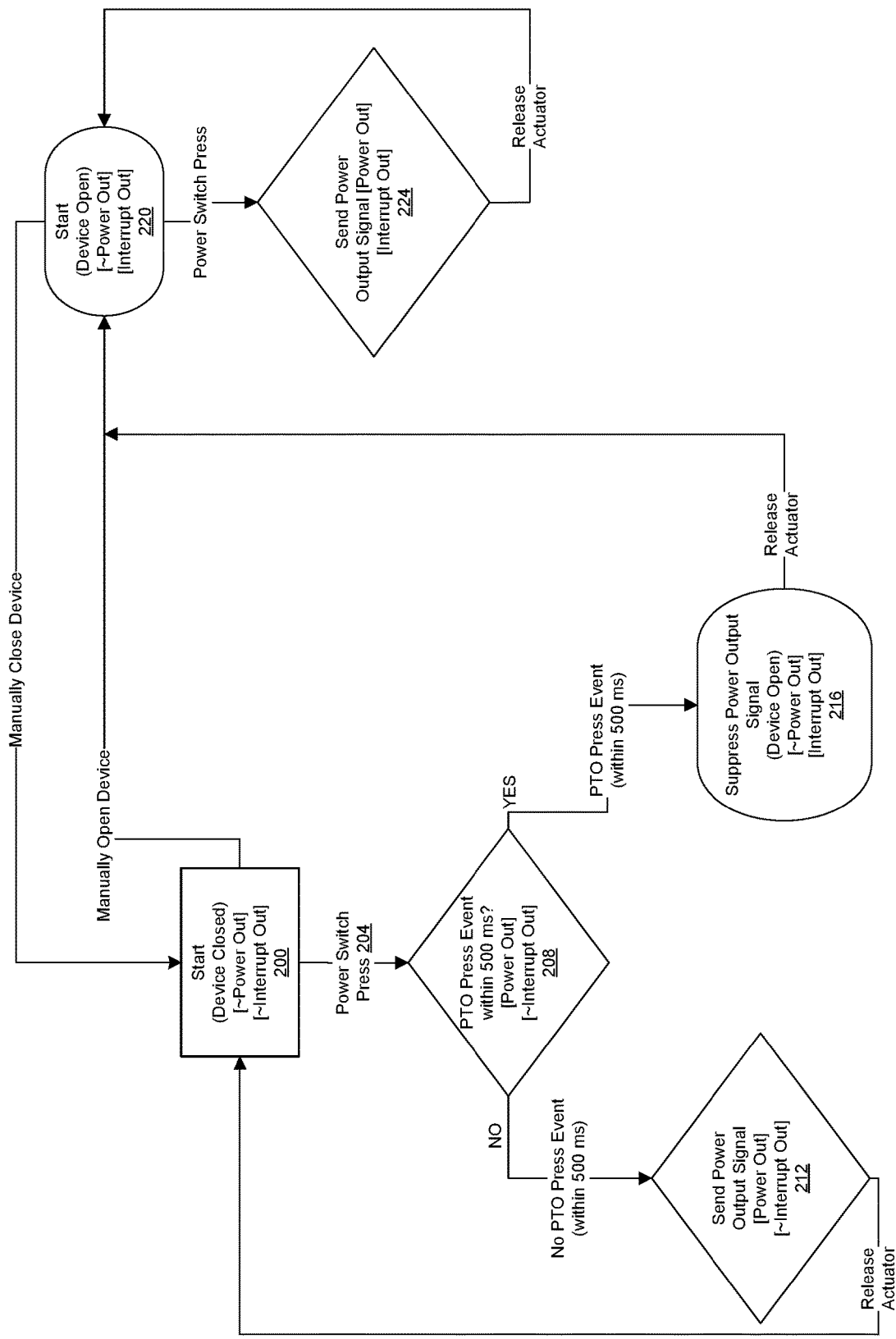
FIG. 7 shows a logic flow diagram that is utilized with the push-to-open mechanism of FIGS. 2-6 according to examples of the present disclosure.
Figure 8:
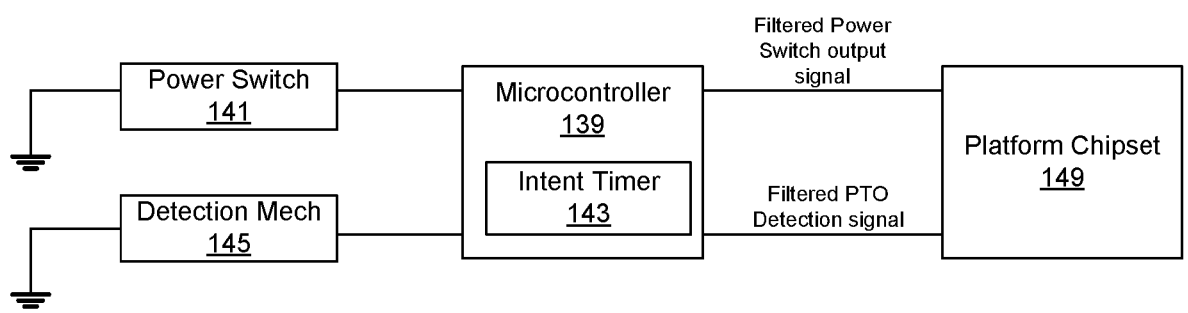
FIG. 8 shows a schematic view of a microcontroller and platform chipset of the foldable computing device according to examples of the present disclosure.

With reference now to FIG. 7, one example of a logic flow of the present disclosure that is utilized with the above-described push-to-open mechanism 119 is provided. In some examples and with reference to FIG. 8, a hardware-logic component, such as a microcontroller 139, is utilized to receive signals from the power switch 141 and detection mechanism 145, execute the logic flow, and manage signal flow to a platform chipset 149 of the foldable computing device 104. In other examples, one or more functions of the logic flows described herein may be performed by logic in the platform chipset 149.

Returning to FIG. 7, in this example at 200 the foldable computing device 104 begins in the closed orientation with the actuator 120 in its non-displaced/extended position of FIG. 2, such that no output signal from the power switch 141 is generated (Power Out) and no interrupt signal from the detection mechanism is generated (Interrupt Out). At 204 a user engages the actuator 120 to actuate the power switch 141, which causes an output signal from the power switch to be sent to the microcontroller 139. At this point the user's intended action is unclear. For example, in some cases the user could intend to power down the external display of the device or activate an accessory or application (such as a flashlight). In other cases, the user's intent is to open the device by continuing to press the actuator 120 until it is fully displaced to actuate the push-to-open mechanism 119.

Accordingly, in one potential advantage of the present disclosure, at 208 the receipt of the output signal from the power switch 141 triggers the microcontroller to start an intent timer 143 that corresponds to a predetermined time period after actuation of the power switch. The predetermined time period is selected to correspond to a longest expected time frame between actuation of the power switch 141 and receipt of an interrupt signal from the detection mechanism 145 indicating that the actuator 120 has reached the displaced position (a PTO Press Event) and the push-to-open mechanism 119 is being actuated to open the device. In the present example, the predetermined time period is 500 milliseconds (ms). In other examples, different time periods may be utilized to correspond to different device configurations, expected user behaviors, and other factors.

In this manner, when a user only actuates and releases the power switch 141 via actuator 120 without continuing to release the push-to-open mechanism 119, the intent timer 143 expires, and at 212 the logic sends the output signal from the power switch to the platform chipset 149 (Power Out) to thereby cause occurrence of a corresponding power switch event that controls the operating state of the computing device (for example, turning off the external display 114C).

On the other hand and returning to 208, when a user continues pressing the actuator 120 to arrive at its fully displaced position before the intent timer 143 expires (e.g., within 500 ms) to release the push-to-open mechanism 119, at 216 the logic suppresses the output signal to refrain from sending it to the platform chipset 149 (Power Out). In this scenario the user intends to open and engage with the foldable device in its open configuration, such as by viewing and/or interacting with the internal displays 114A, 114B. Advantageously, by suppressing the power output signal in this scenario, the logic prevents the occurrence of a (unintended) corresponding power switch event, such as turning off the displays 114A, 114B. In this manner, the user can quickly and easily transition from using/interacting with the external display 114C to using/interacting with the internal displays 114,A, 114B without encountering an undesired power switch event and its unintended consequences.

Returning to FIG. 7, when the user releases the actuator 120 after opening the device, at 220 the logic continues to receive the interrupt signal (Interrupt Out) from the detection mechanism 145 by virtue of the spring 148 biasing the actuator 120 and its pusher arm 134 to remain in the displaced position as described above. Accordingly, while the foldable device 104 is in the open configuration, at 224 the logic responds to any power switch actuations by sending the power output signal to the platform chipset 149 to cause occurrence of a corresponding power switch event that controls the operating state of the foldable computing device 104. When the user manually closes the device, the interrupt signal from the detection mechanism 145 is no longer received and the logic returns to 200.

Advantageously and as described above, these configurations of the present disclosure enable the provision of a single actuator 120 for controlling both a power switch 141 and a push-to-open mechanism 119, while also providing logic that anticipates a user's intention when actuating the actuator and correspondingly controls an operating state of the computing device, such as by suppressing a power output signal in selected scenarios. Accordingly, the user can utilize one actuator 120 to quickly and easily open the foldable computing device 104 from a closed orientation to transition from the external display 114C to the internal displays 114,A, 114B, and can use the same actuator 120 to actuate the power switch 141 for various purposes, all while avoiding unintended power switch events and their consequences.

Figure 9:
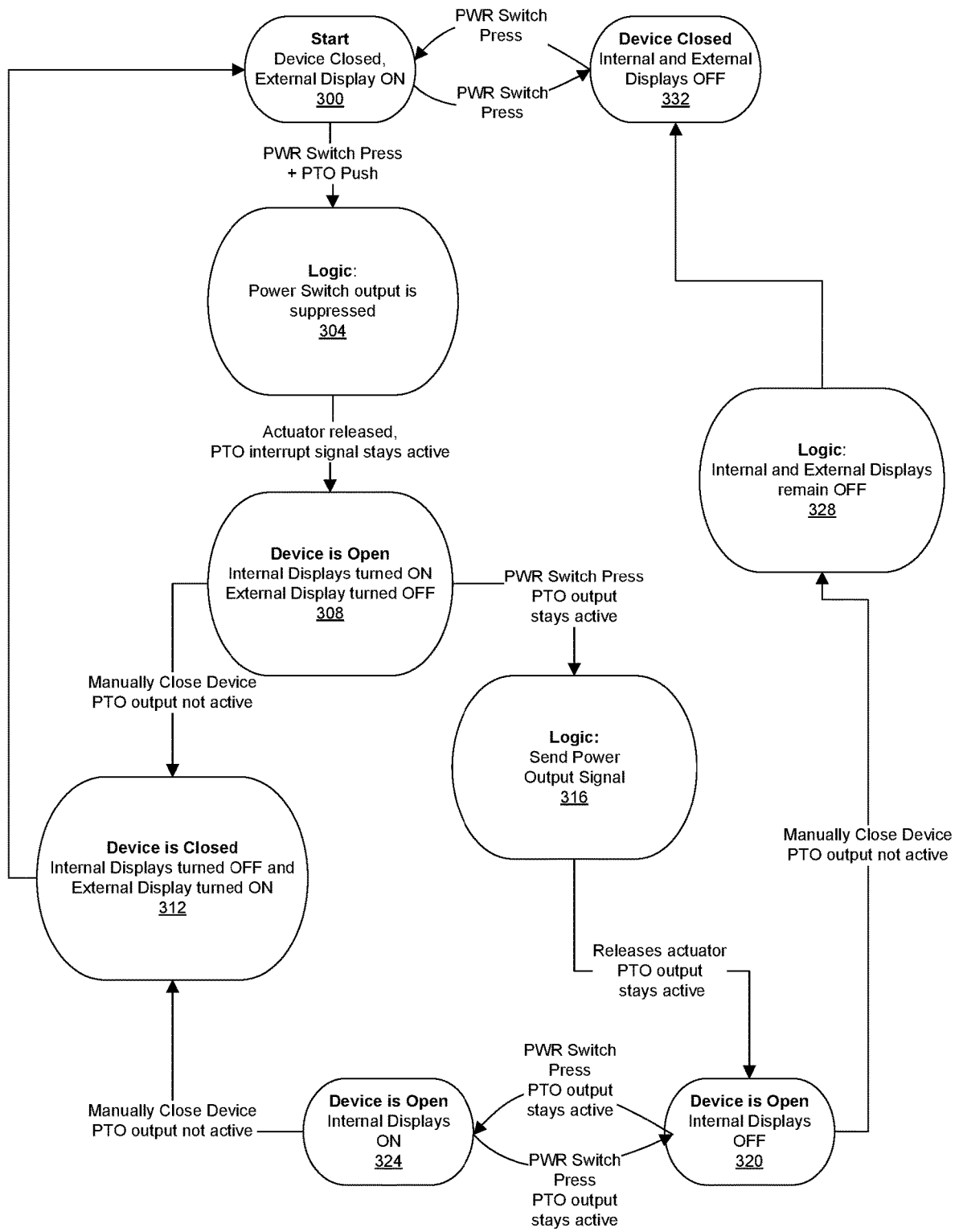
FIG. 9 shows a logic flow diagram of one use case scenario utilizing the logic flow of FIG. 7.

With reference now to FIG. 9, one example use case scenario utilizing the logic flow described above is presented. At 300 the foldable computing device 104 is closed and the third, external display 114C is powered on. A user presses the actuator 120 to actuate the power switch 141 and trigger the push-to-open (PTO) mechanism 119 within the predetermined time from receiving the power output signal, which causes the logic to receive an interrupt signal from the detection mechanism 145 within the predetermined time from receiving the power output signal. Accordingly, at 304 the logic suppresses the power switch output. The user then releases the actuator 120, and the logic continues to receive the interrupt signal from the detection mechanism 145 as described above. Accordingly and at 308, the device is open and the internal displays 114A, 114B are turned on. Additionally and in this example, the logic is programmed to prevent the internal displays 114A, 114B and the external display 114C from being on at the same time. Accordingly, at 308 when the internal displays 114A, 114B are turned on, the external display 114C is turned off.

If the user manually closes the device, the logic detects the absence of an interrupt signal from the detection mechanism 145 and receives a closure signal from one or more closure sensors indicating the device is closed. Accordingly and at 312, the internal displays 114A, 114B are turned off and the third, external display 114C is turned on. Returning to 308 where the device is open, if the user then actuates the power switch 141, the logic detects the interrupt signal from the detection mechanism 145, and the power output signal is output to the platform chipset. In this example and at 320, the power output signal is used by the platform chipset to turn off the internal displays 114A, 114B. With reference also to 324 and while the device remains in the open configuration, subsequent actuations of the power switch 141 cause the internal displays 114A, 114B to toggle between on and off.

Returning to 320, if the user then manually closes the device, the logic detects the absence of an interrupt signal from the detection mechanism 145 and receives a closure signal from one or more closure sensors indicating the device is closed. Accordingly and at 328, the internal displays 114A, 114B and external display 114C remain off, and at 332 the device is closed with all displays turned off.

Figure 10:
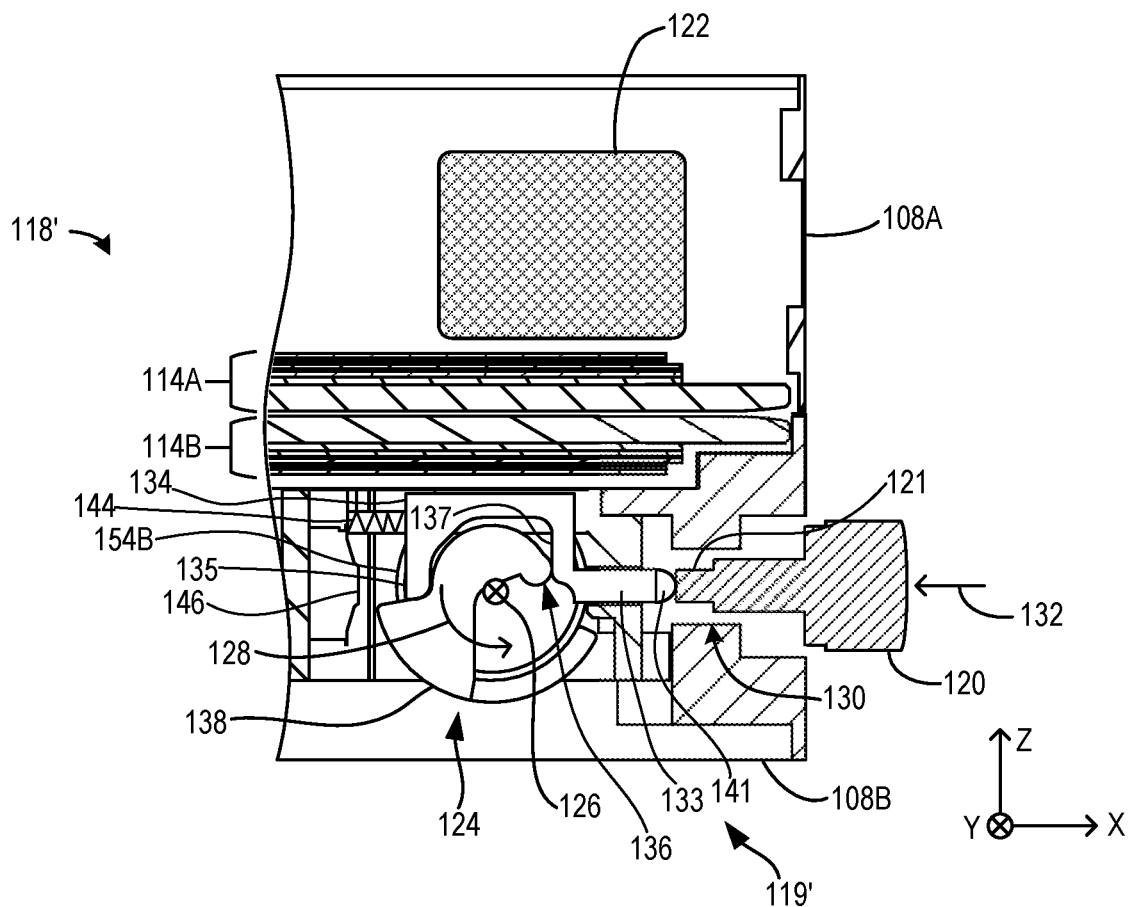
FIG. 10 shows a partial cross-sectional view taken along line 2-2 of FIG. 1D showing a return-biased push-to-open mechanism according to examples of the present disclosure.
Figure 11:
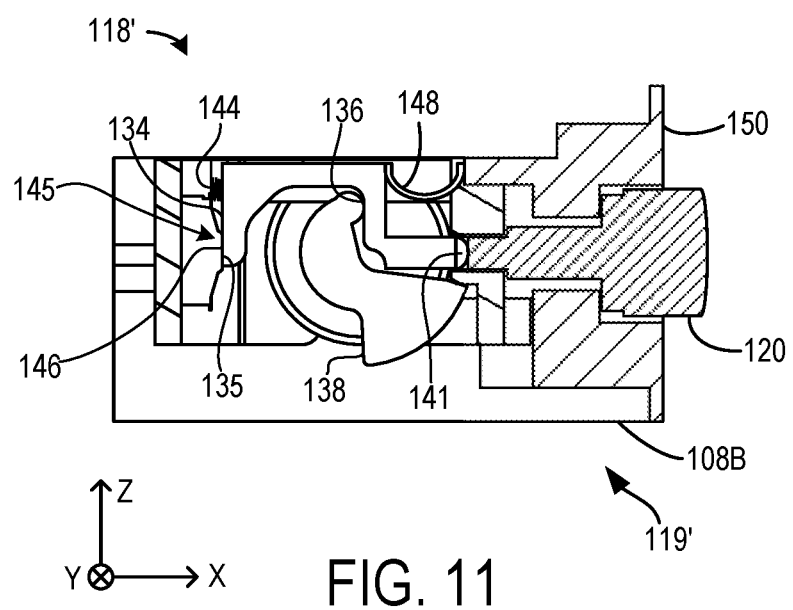
FIG. 11 shows the return-biased push-to-open mechanism in a displaced position according to examples of the present disclosure.

With reference now to FIGS. 10 and 11, in other examples the foldable computing device 104 utilizes a return-biased push-to-open mechanism 119' that is biased to return the actuator 120 to a non-displaced (extended) position from the displaced position whenever it is released, thereby causing the contacting surface 135 of the pusher arm 134 to cease contacting the receiving surface 146 of the detection mechanism. In this manner, the interrupt signal from the detection mechanism 145 is active only when the actuator 120 reaches the fully displaced position corresponding to opening the device from the closed configuration. In this manner, and in one potential advantage of this configuration, the actuator 120 is normally positioned in a more prominent, extended orientation as shown in FIG. 10, which increases the accessibility of the actuator and corresponding power switch 141 to users in both open and closed orientations.

In one example and as shown in FIGS. 10 and 11, a return-biased opening/closing apparatus 118' includes a return spring 144 that biases the pusher arm 134 in the positive x-axis direction. In this configuration, upon releasing the actuator 120 from its displaced position shown in FIG. 11, the return spring 144 translates the actuator 120 back to the extended position of FIG. 10. In these examples, the logic is configured to suppress the power output signal whenever the interrupt signal from the PTO detection mechanism 145 is active.

Figure 12:
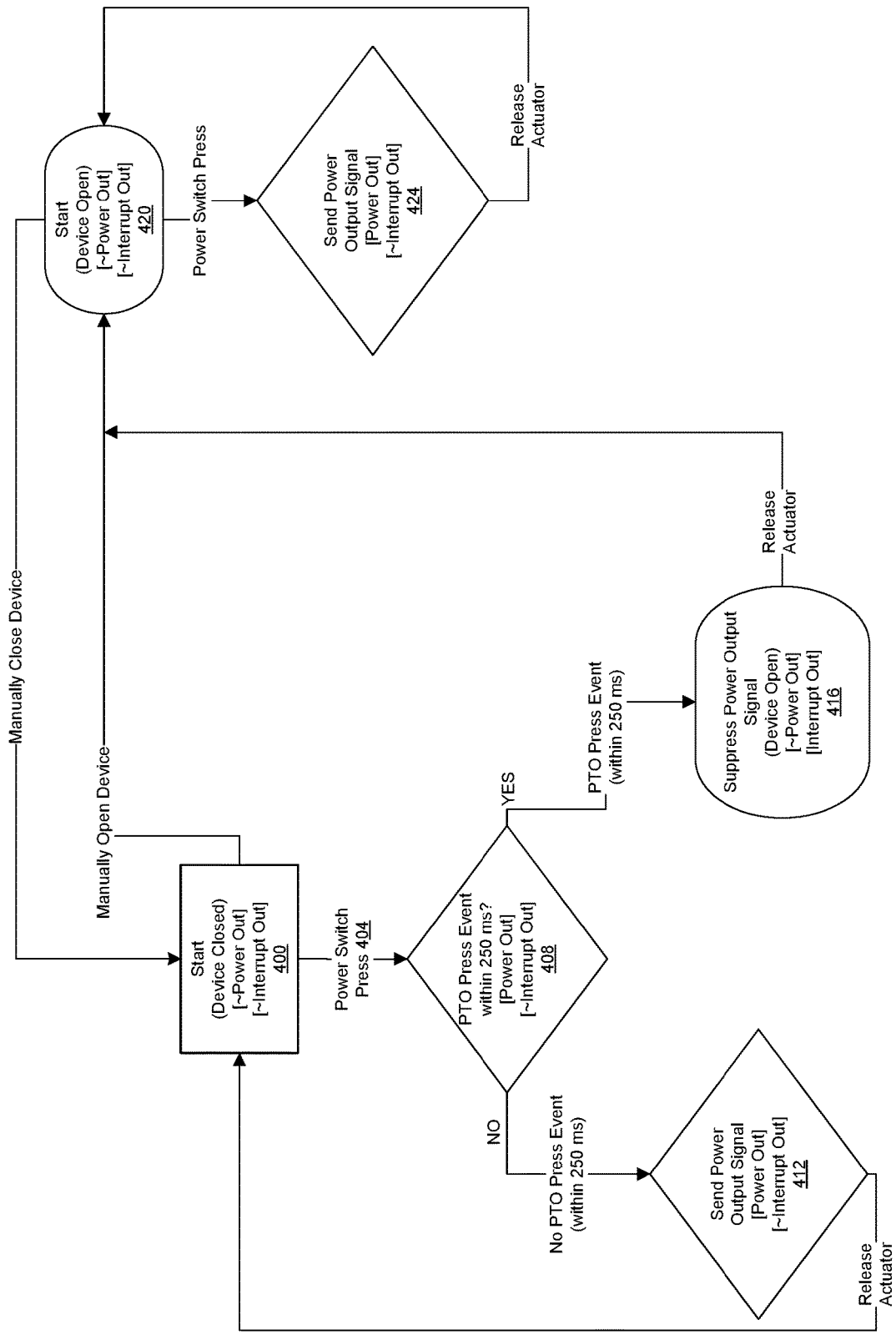
FIG. 12 shows a logic flow diagram that is utilized with the return-biased push-to-open mechanism of FIGS. 10-11 according to examples of the present disclosure.

With reference now to FIG. 12, an example of a logic flow of the present disclosure that is utilized with the above-described return-biased push-to-open mechanism 119' is provided. In some examples and with reference to FIG. 8, a hardware-logic component, such as a microcontroller 139, is utilized to receive signals from the power switch 141 and detection mechanism 145, execute the logic flow, and manage signal flow to a platform chipset 149 of the foldable computing device 104. In other examples, one or more functions of the logic flows described herein may be performed by logic in the platform chipset 149.

Returning to FIG. 12, in this example at 400 the foldable computing device 104 begins in the closed orientation such that no output signal from the power switch 141 is generated (Power Out) and no interrupt signal from the detection mechanism is generated (Interrupt Out). At 404 a user engages the actuator 120 to actuate the power switch 141, which causes an output signal from the power switch to be sent to the microcontroller 139. As described above, at this point the user's intended action is unclear.

Accordingly, in one potential advantage of the present disclosure, at 408 the receipt of the output signal from the power switch 141 triggers the microcontroller to start the intent timer 143 that corresponds to a predetermined time period after actuation of the power switch. As explained above, the predetermined time period is selected to correspond to a longest expected time frame between actuation of the power switch 141 and receipt of an interrupt signal from the detection mechanism 145 indicating that the actuator 120 has reached the displaced position (a PTO Press Event) and the push-to-open mechanism 119 is being actuated to open the device. In the present example, the predetermined time period is 250 milliseconds (ms). In other examples, different time periods may be utilized.

In this manner, when a user actuates and releases the power switch 141 via actuator 120 without continuing to release the push-to-open mechanism 119, the intent timer 143 expires, and at 412 the logic sends the output signal from the power switch to the platform chipset 149 (Power Out) to thereby cause occurrence of a corresponding power switch event that controls the operating state of the computing device (for example, turning off the external display 114C).

On the other hand and returning to 408, when a user continues pressing the actuator 120 to its fully displaced position before the intent timer 143 expires (e.g., within 250 ms) to release the push-to-open mechanism 119, thereby triggering the interrupt signal from the detection mechanism 145, at 416 the logic suppresses the output signal to refrain from sending it to the platform chipset 149 (Power Out). In this scenario the user intends to open and engage with the foldable device in its open configuration, such as by viewing and/or interacting with the internal displays 114A, 114B. Advantageously, by suppressing the power output signal the logic prevents the occurrence of an unintended corresponding power switch event, such as turning off the displays 114A, 114B. In this manner, the user can quickly and easily transition from using/interacting with the external display 114C to using/interacting with the internal displays 114,A, 114B, without encountering an undesired power switch event and its unintended consequences.

Returning to FIG. 12, when the user releases the actuator 120 after opening the device, the return spring 144 of the return-biased opening/closing apparatus 118' translates the actuator 120 back to the extended position of FIG. 10, thereby negating the interrupt signal (Interrupt Out) and the power output signal (Power Out). Accordingly, at 420 the logic ceases to receive the interrupt signal (Interrupt Out) from the detection mechanism 145. It follows that while the foldable device 104 is in the open configuration, at 424 the logic responds to any power switch actuations by sending the power output signal to the platform chipset 149 to cause occurrence of a corresponding power switch event that controls the operating state of the foldable computing device 104. When the user manually closes the device, the interrupt signal from the detection mechanism 145 remains negated and the logic returns to 400.

Figure 13:
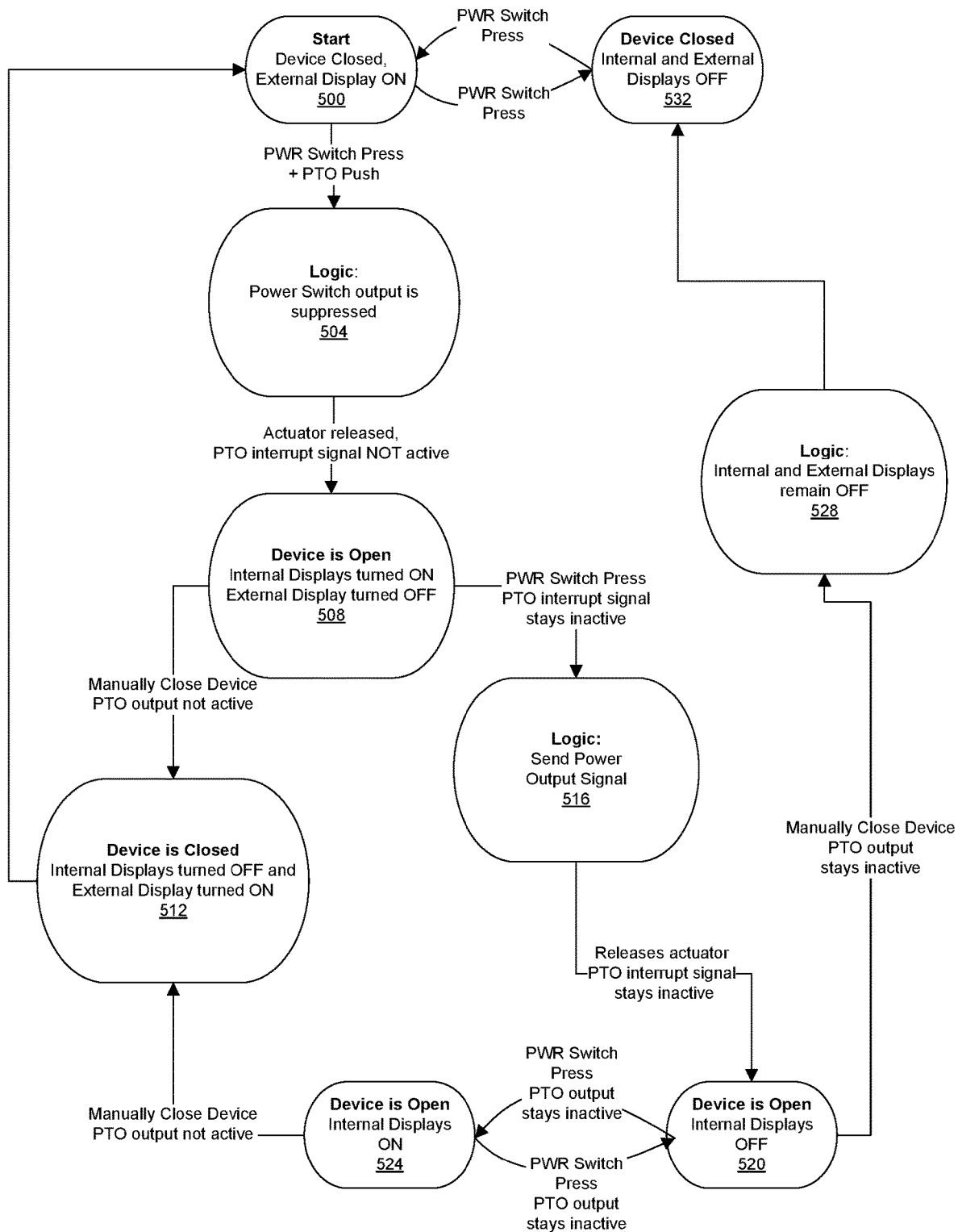
FIG. 13 shows a logic flow diagram of one use case scenario utilizing the logic flow of FIG. 12.

With reference now to FIG. 13, one example use case scenario utilizing the logic flow and the return-biased opening/closing apparatus 118' described above is presented. At 500 the foldable computing device 104 is closed and the third, external display 114C is powered on. A user presses the actuator 120 to actuate the power switch 141 and trigger the push-to-open (PTO) mechanism 119 within the predetermined time from receiving the power output signal, which causes the logic to receive an interrupt signal from the detection mechanism 145 within the predetermined time from receiving the power output signal. Accordingly, at 504 the logic suppresses the power switch output. The user then releases the actuator 120, and the return spring 144 of the return-biased opening/closing apparatus 118' translates the actuator 120 back to the extended position of FIG. 10. This causes the logic to cease receiving the interrupt signal from the detection mechanism 145. Accordingly, and at 508, the device is open and the internal displays 114A, 114B are turned on. Additionally and in this example, the logic is programmed to prevent the internal displays 114A, 114B and the external display 114C from being on at the same time. Accordingly, at 508 when the internal displays 114A, 114B are turned on, the external display 114C is turned off.

If the user manually closes the device, the logic receives a closure signal from one or more closure sensors indicating the device is closed. Accordingly and at 512, the internal displays 114A, 114B are turned off and the third, external display 114C is turned on. Returning to 508 where the device is open, if the user then actuates the power switch 141, at 516 the logic detects the lack of an interrupt signal from the detection mechanism 145, and the power output signal is output to the platform chipset. In this example and at 520, the power output signal is used by the chipset to turn off the internal displays 114A, 114B. With reference also to 524 and while the device remains in the open configuration, subsequent actuations of the power switch 141 cause the internal displays 114A, 114B to toggle between on and off.

Returning to 520, if the user then manually closes the device, the logic detects the absence of an interrupt signal from the detection mechanism 145 and receives a closure signal from one or more closure sensors indicating the device is closed. Accordingly and at 528, the internal displays 114A, 114B and external display 114C remain off, and at 532 the device is closed with all displays turned off.

Figure 14A:
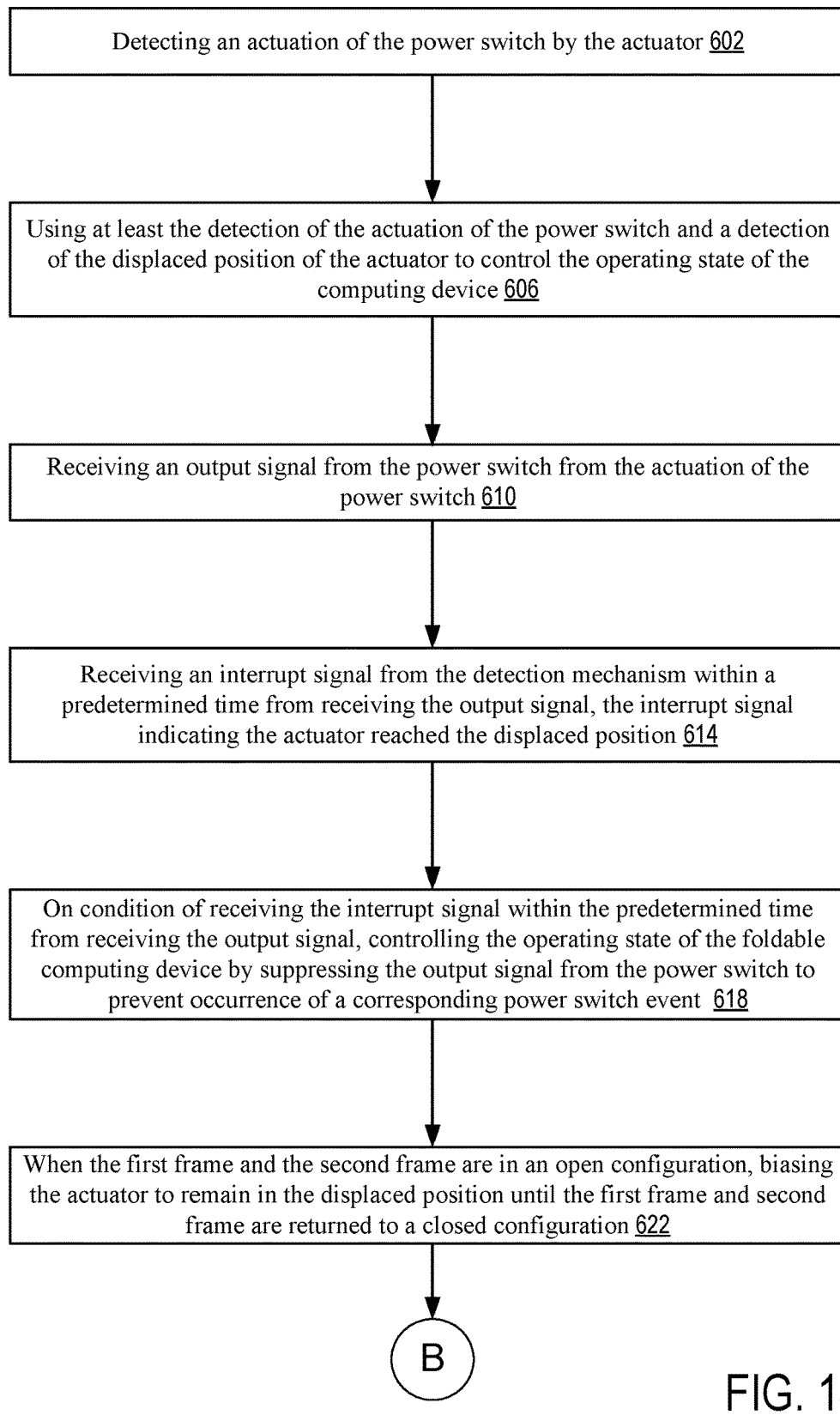
FIGS. 14A and 14B show a block diagram of an example method for controlling an operating state of a foldable computing device according to examples of the present disclosure.
Figure 14B:
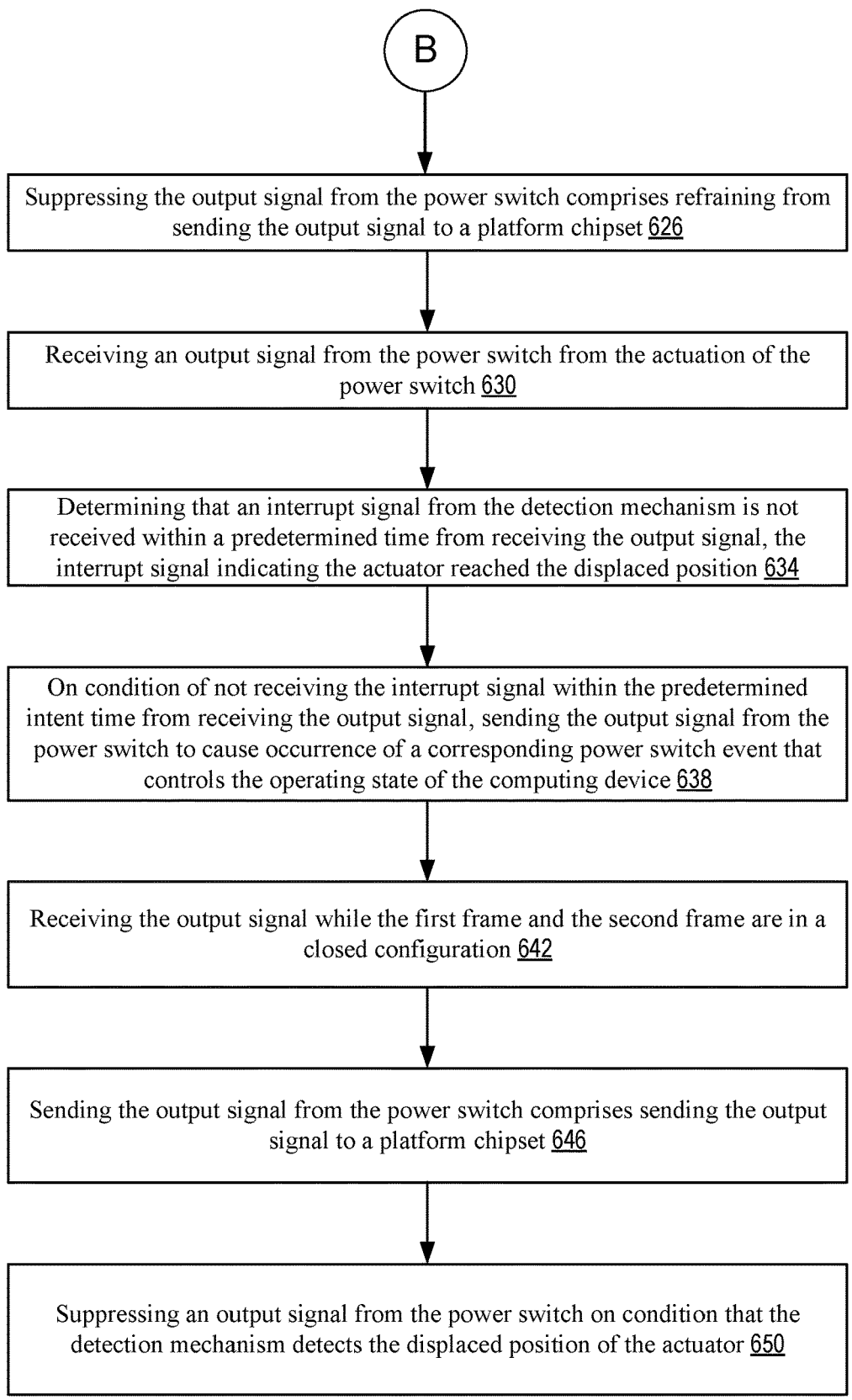

With reference now to FIGS. 14A and 14B, a flow diagram is provided depicting an example method 600 for controlling an operating state of a foldable computing device. The following description of method 600 is provided with reference to the components described herein and shown in FIGS. 1-13. The method 600 is performed at a foldable computing device comprising a first frame rotatably coupled to a second frame, with the second frame comprising a push-to-open mechanism comprising an actuator and a power switch located for actuation by the actuator, and a detection mechanism configured to detect at least a displaced position of the actuator that corresponds to releasing the foldable computing device from a closed configuration. In some examples, the method 600 is performed at the foldable computing device 104 of FIGS. 1A-1D using logic as described in the examples provided herein. In other examples, the method 600 is performed in other contexts using other suitable components.

At 602, the method 600 includes detecting an actuation of the power switch by the actuator. At 606 the method 600 includes using at least the detection of the actuation of the power switch and a detection of the displaced position of the actuator to control the operating state of the computing device. At 610 the method 600 includes receiving an output signal from the power switch from the actuation of the power switch. At 614 the method 600 includes receiving an interrupt signal from the detection mechanism within a predetermined time from receiving the output signal, the interrupt signal indicating the actuator reached the displaced position. At 618 the method 600 includes, on condition of receiving the interrupt signal within the predetermined time from receiving the output signal, controlling the operating state of the foldable computing device by suppressing the output signal from the power switch to prevent occurrence of a corresponding power switch event.

At 622 the method 600 includes, when the first frame and the second frame are in an open configuration, biasing the actuator to remain in the displaced position until the first frame and second frame are returned to a closed configuration. With reference now to FIG. 14B, at 626 the method 600 includes, wherein suppressing the output signal from the power switch comprises refraining from sending the output signal to a platform chipset. At 630 the method 600 includes receiving an output signal from the power switch from the actuation of the power switch. At 634 the method 600 includes determining that an interrupt signal from the detection mechanism is not received within a predetermined time from receiving the output signal, the interrupt signal indicating the actuator reached the displaced position. At 638 the method 600 includes, on condition of not receiving the interrupt signal within the predetermined time from receiving the output signal, sending the output signal from the power switch to cause occurrence of a corresponding power switch event that controls the operating state of the computing device.

At 642 the method 600 includes, receiving the output signal while the first frame and the second frame are in a closed configuration. At 646 the method 600 includes, wherein sending the output signal from the power switch comprises sending the output signal to a platform chipset. At 650 the method 600 includes suppressing an output signal from the power switch on condition that the detection mechanism detects the displaced position of the actuator.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 15:
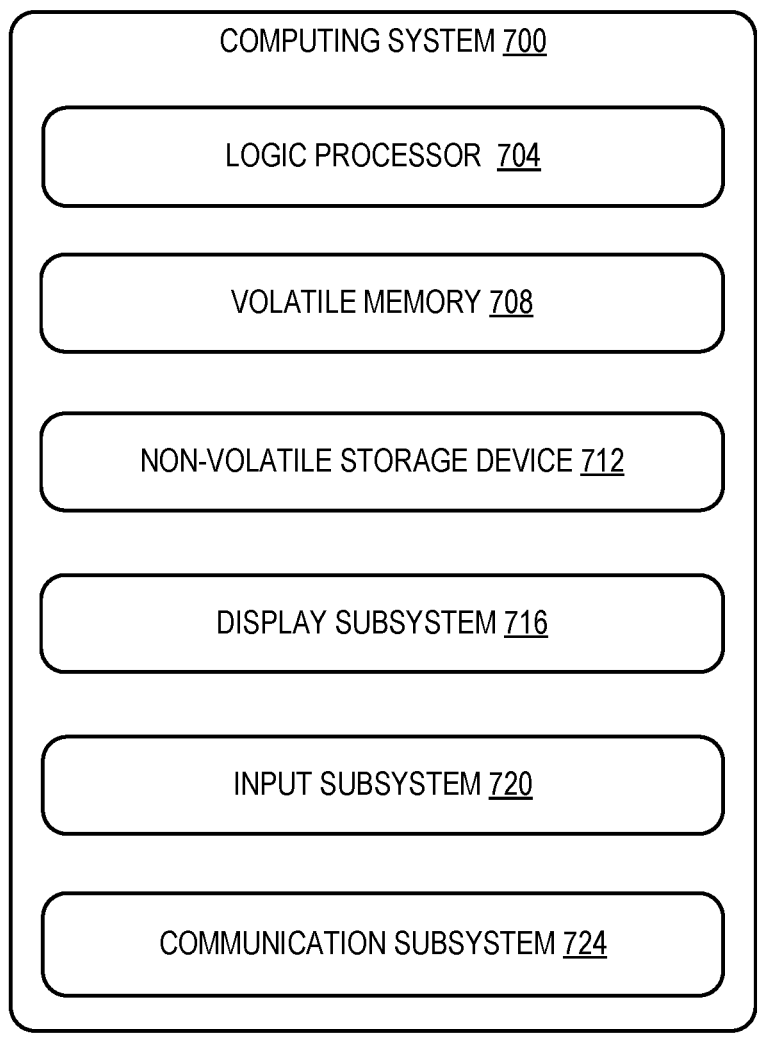
FIG. 15 shows a block diagram of an example computing system according to examples of the present disclosure.

FIG. 15 schematically shows a simplified representation of a computing system 700 configured to provide any to all of the compute functionality described herein. Computing system 700 may take the form of a foldable computing device, one or more personal computers, tablet computers, home-entertainment computers, gaming devices, mobile computing devices, mobile communication devices (e.g., smart phone), virtual/augmented/mixed reality computing devices, wearable computing devices, and/or other computing devices. The foldable computing device 104 described above may comprise computing system 700 or one or more aspects of computing system 700.

Computing system 700 includes a logic processor 704, volatile memory 708, and a non-volatile storage device 712. Computing system 700 may optionally include a display subsystem 716, input subsystem 720, communication subsystem 724, and/or other components not shown in FIG. 15.

Logic processor 704 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 704 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory 708.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device 712.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), microcontroller units (MCUs), and complex programmable logic devices (CPLDs), for example.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure, or such display devices may be peripheral display devices.

When included, input subsystem 720 may comprise or interface with one or more user-input devices such as a stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 724 may be configured to communicatively couple various computing devices described herein with each other, and with other devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a foldable computing device, comprising: a first frame; and a second frame rotatably coupled to the first frame, the second frame comprising, a push-to-open mechanism comprising: an actuator; and a power switch located for actuation by the actuator; and a detection mechanism configured to detect at least a displaced position of the actuator that corresponds to releasing the foldable computing device from a closed configuration; a processor; and a memory storing instructions executable by the processor to: detect an actuation of the power switch by the actuator; and using at least the detection of the actuation of the power switch and a detection of the displaced position of the actuator, control an operating state of the computing device. The foldable computing device may additionally or alternatively include instructions executable to: receive an output signal from the power switch from the actuation of the power switch; receive an interrupt signal from the detection mechanism within a predetermined time from receiving the output signal, the interrupt signal indicating the actuator reached the displaced position; and on condition of receiving the interrupt signal within the predetermined time from receiving the output signal, control the operating state of the foldable computing device by suppressing the output signal from the power switch to prevent occurrence of a corresponding power switch event. The foldable computing device may additionally or alternatively include, wherein when the first frame and the second frame are in an open configuration, the actuator is biased to remain in the displaced position until the first frame and the second frame are returned to a closed configuration. The foldable computing device may additionally or alternatively include, wherein suppressing the output signal from the power switch comprises refraining from sending the output signal to a platform chipset. The foldable computing device may additionally or alternatively include instructions executable to: receive an output signal from the power switch from the actuation of the power switch; determine that an interrupt signal from the detection mechanism is not received within a predetermined time from receiving the output signal, the interrupt signal indicating the actuator reached the displaced position; and on condition of not receiving the interrupt signal within the predetermined time from receiving the output signal, send the output signal from the power switch to cause occurrence of a corresponding power switch event that controls the operating state of the foldable computing device. The foldable computing device may additionally or alternatively include, wherein the output signal is received from the power switch while the first frame and the second frame are in a closed configuration. The foldable computing device may additionally or alternatively include, wherein sending the output signal from the power switch comprises sending the output signal to a platform chipset. The foldable computing device may additionally or alternatively include, wherein controlling an operating state of the foldable computing device comprises powering on or powering off a display of the foldable computing device. The foldable computing device may additionally or alternatively include instructions executable to suppress an output signal from the power switch on condition that the detection mechanism detects the displaced position of the actuator. The foldable computing device may additionally or alternatively include, wherein the actuator is biased to return to a non-displaced position from the displaced position. The foldable computing device may additionally or alternatively include, wherein the detection mechanism comprises a receiving surface and the actuator comprises a contacting surface configured to contact the receiving surface when the actuator reaches the displaced position.

Another aspect provides, a method for controlling an operating state of a foldable computing device, the foldable computing device comprising a first frame rotatably coupled to a second frame, the second frame comprising a push-to-open mechanism comprising an actuator and a power switch located for actuation by the actuator, and a detection mechanism configured to detect at least a displaced position of the actuator that corresponds to releasing the foldable computing device from a closed configuration, the method comprising: detecting an actuation of the power switch by the actuator; and using at least the detection of the actuation of the power switch and a detection of the displaced position of the actuator to control the operating state of the computing device. The method may additionally or alternatively include receiving an output signal from the power switch from the actuation of the power switch; receiving an interrupt signal from the detection mechanism within a predetermined time from receiving the output signal, the interrupt signal indicating the actuator reached the displaced position; and on condition of receiving the interrupt signal within the predetermined time from receiving the output signal, controlling the operating state of the foldable computing device by suppressing the output signal from the power switch to prevent occurrence of a corresponding power switch event. The method may additionally or alternatively include, when the first frame and the second frame are in an open configuration, biasing the actuator to remain in the displaced position until the first frame and second frame are returned to a closed configuration. The method may additionally or alternatively include, wherein suppressing the output signal from the power switch comprises refraining from sending the output signal to a platform chipset. The method may additionally or alternatively include receiving an output signal from the power switch from the actuation of the power switch; determining that an interrupt signal from the detection mechanism is not received within a predetermined time from receiving the output signal, the interrupt signal indicating the actuator reached the displaced position; and on condition of not receiving the interrupt signal within the predetermined time from receiving the output signal, sending the output signal from the power switch to cause occurrence of a corresponding power switch event that controls the operating state of the computing device. The method may additionally or alternatively include receiving the output signal while the first frame and the second frame are in a closed configuration. The method may additionally or alternatively include, wherein sending the output signal from the power switch comprises sending the output signal to a platform chipset. The method may additionally or alternatively include, wherein controlling the operating state of the foldable computing device comprises suppressing an output signal from the power switch on condition that the detection mechanism detects the displaced position of the actuator.

Another aspect provides foldable computing device, comprising: a first frame; and a second frame rotatably coupled to the first frame, the second frame comprising, a push-to-open mechanism configured to release the foldable computing device from a closed configuration, the push-to-open mechanism comprising: an actuator comprising a contacting surface; and a power switch located for actuation by the actuator; and a detection mechanism configured to detect at least a displaced position of the actuator that corresponds to releasing the foldable computing device from the closed configuration, the detection mechanism comprising a receiving surface, wherein the contacting surface of the actuator is configured to contact the receiving surface when the actuator reaches the displaced position; a processor; and a memory storing instructions executable by the processor to: receive an output signal from the power switch from an actuation of the power switch by the actuator; receive an interrupt signal from the detection mechanism within a predetermined time from receiving the output signal from the power switch, the interrupt signal indicating the actuator reached the displaced position; and on condition of receiving the interrupt signal within the predetermined time from receiving the output signal, suppress the output signal from the power switch to prevent occurrence of a corresponding power switch event that controls an operating state of the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A foldable computing device, comprising:
a first frame; and
a second frame rotatably coupled to the first frame, the second frame comprising,
a push-to-open mechanism comprising:
an actuator; and a power switch located for actuation by the actuator; and a detection mechanism configured to detect at least a displaced position of the actuator that corresponds to releasing the foldable computing device from a closed configuration;

a processor; and a memory storing instructions executable by the processor to:

detect an actuation of the power switch by the actuator; and using at least the detection of the actuation of the power switch and a detection of the displaced position of the actuator, control an operating state of the computing device by suppressing an output signal from the power switch on condition that the detection mechanism detects the displaced position of the actuator.

2. The foldable computing device of claim 1, wherein the instructions are executable to:

receive the output signal from the power switch from the actuation of the power switch;

receive an interrupt signal from the detection mechanism within a predetermined time from receiving the output signal, the interrupt signal indicating the actuator reached the displaced position; and on condition of receiving the interrupt signal within the predetermined time from receiving the output signal, control the operating state of the foldable computing device by suppressing the output signal from the power switch to prevent occurrence of a corresponding power switch event.

3. The foldable computing device of claim 2, wherein when the first frame and the second frame are in an open configuration, the actuator is biased to remain in the displaced position until the first frame and the second frame are returned to a closed configuration.

4. The foldable computing device of claim 2, wherein suppressing the output signal from the power switch comprises refraining from sending the output signal to a platform chipset.

5. The foldable computing device of claim 1, wherein the instructions are executable to:

receive the output signal from the power switch from the actuation of the power switch;

determine that an interrupt signal from the detection mechanism is not received within a predetermined time from receiving the output signal, the interrupt signal indicating the actuator reached the displaced position; and on condition of not receiving the interrupt signal within the predetermined time from receiving the output signal, send the output signal from the power switch to cause occurrence of a corresponding power switch event that controls the operating state of the foldable computing device.

6. The foldable computing device of claim 5, wherein the output signal is received from the power switch while the first frame and the second frame are in a closed configuration.

7. The foldable computing device of claim 5, wherein sending the output signal from the power switch comprises sending the output signal to a platform chipset.

8. The foldable computing device of claim 1, wherein controlling an operating state of the foldable computing device comprises powering on or powering off a display of the foldable computing device.

9. The foldable computing device of claim 1, wherein the actuator is biased to return to a non-displaced position from the displaced position.

10. The foldable computing device of claim 1, wherein the detection mechanism comprises a receiving surface and the actuator comprises a contacting surface configured to contact the receiving surface when the actuator reaches the displaced position.

11. A method for controlling an operating state of a foldable computing device, the foldable computing device comprising a first frame rotatably coupled to a second frame, the second frame comprising a push-to-open mechanism comprising an actuator and a power switch located for actuation by the actuator, and a detection mechanism configured to detect at least a displaced position of the actuator that corresponds to releasing the foldable computing device from a closed configuration, the method comprising:

detecting an actuation of the power switch by the actuator; and using at least the detection of the actuation of the power switch and a detection of the displaced position of the actuator to control the operating state of the computing device by suppressing an output signal from the power switch on condition that the detection mechanism detects the displaced position of the actuator.

12. The method of claim 11, further comprising:

receiving the output signal from the power switch from the actuation of the power switch;

receiving an interrupt signal from the detection mechanism within a predetermined time from receiving the output signal, the interrupt signal indicating the actuator reached the displaced position; and on condition of receiving the interrupt signal within the predetermined time from receiving the output signal, controlling the operating state of the foldable computing device by suppressing the output signal from the power switch to prevent occurrence of a corresponding power switch event.

13. The method of claim 12, further comprising, when the first frame and the second frame are in an open configuration, biasing the actuator to remain in the displaced position until the first frame and second frame are returned to a closed configuration.

14. The method of claim 12, wherein suppressing the output signal from the power switch comprises refraining from sending the output signal to a platform chipset.

15. The method of claim 11, further comprising:

receiving the output signal from the power switch from the actuation of the power switch;

determining that an interrupt signal from the detection mechanism is not received within a predetermined time from receiving the output signal, the interrupt signal indicating the actuator reached the displaced position; and on condition of not receiving the interrupt signal within the predetermined time from receiving the output signal, sending the output signal from the power switch to cause occurrence of a corresponding power switch event that controls the operating state of the computing device.

16. The method of claim 15, further comprising receiving the output signal while the first frame and the second frame are in a closed configuration.

17. The method of claim 15, wherein sending the output signal from the power switch comprises sending the output signal to a platform chipset.

18. A foldable computing device, comprising:
a first frame; and
a second frame rotatably coupled to the first frame, the second frame comprising,
- a push-to-open mechanism configured to release the foldable computing device from a closed configuration, the push-to-open mechanism comprising:
  - an actuator comprising a contacting surface; and
  - a power switch located for actuation by the actuator; and
- a detection mechanism configured to detect at least a displaced position of the actuator that corresponds to releasing the foldable computing device from the closed configuration, the detection mechanism comprising a receiving surface, wherein the contacting surface of the actuator is configured to contact the receiving surface when the actuator reaches the displaced position;

a processor; and
a memory storing instructions executable by the processor to:
- receive an output signal from the power switch from an actuation of the power switch by the actuator;
- receive an interrupt signal from the detection mechanism within a predetermined time from receiving the output signal from the power switch, the interrupt signal indicating the actuator reached the displaced position; and
- on condition of receiving the interrupt signal within the predetermined time from receiving the output signal, suppress the output signal from the power switch to prevent occurrence of a corresponding power switch event that controls an operating state of the computing device.

\* \* \* \* \*